United States Patent [19]
Ceshkovsky

[11] Patent Number: 5,978,329
[45] Date of Patent: Nov. 2, 1999

[54] TECHNIQUE FOR CLOSED LOOP SERVO OPERATION IN OPTICAL DISC TRACKING CONTROL

[75] Inventor: Ludwig Ceshkovsky, Fountain Valley, Calif.

[73] Assignee: Discovision Associates, Irvine, Calif.

[21] Appl. No.: 08/474,424

[22] Filed: Jun. 7, 1995

[51] Int. Cl.⁶ .................................................. G11B 7/085
[52] U.S. Cl. ..................................... 369/44.28; 369/44.29
[58] Field of Search .................................. 369/32, 44.25, 369/44.27, 44.28, 44.29

[56] References Cited

U.S. PATENT DOCUMENTS

| | | |
|---|---|---|
| Re. 32,051 | 12/1985 | Ceshkovsky et al. . |
| Re. 32,431 | 6/1987 | Dakin et al. . |
| Re. 32,574 | 1/1988 | Ceshkovsky et al. ..................... 369/32 |
| Re. 32,709 | 7/1988 | Ceshkovsky et al. . |
| 3,530,258 | 9/1970 | Gregg et al. . |
| 3,633,038 | 1/1972 | Falk . |

(List continued on next page.)

FOREIGN PATENT DOCUMENTS

| | | |
|---|---|---|
| 0227445 | 7/1987 | European Pat. Off. . |
| 0307130 | 3/1989 | European Pat. Off. . |
| 0459420 | 12/1991 | European Pat. Off. . |
| 0462561 | 12/1991 | European Pat. Off. . |
| 0521619 | 1/1993 | European Pat. Off. . |
| 0586084 | 3/1994 | European Pat. Off. . |
| 58-056256 | 4/1983 | Japan . |
| 59-68829 | 4/1984 | Japan . |
| 59-185071 | 10/1984 | Japan . |
| 61-80530 | 4/1986 | Japan . |
| 62-57128 | 3/1987 | Japan . |
| 64-14733 | 1/1989 | Japan . |
| 2-304718 | 12/1990 | Japan . |
| 3-48576 | 7/1991 | Japan . |
| 2150385 | 6/1985 | United Kingdom . |
| 91/06949 | 5/1991 | WIPO . |

OTHER PUBLICATIONS

Patent Abstracts of Japan, vol. 95, No. 10, Nov. 30, 1995 for JP7–182668.

Elliman, DG & PJ Connor, "Orientation and Scale Invariant Symbol Recognition Using a Hidden Markov Model," University of Nottingham, United Kingdom, 1993(?) pp. 331–334.

Dean, Mark E., David L. Dill & Mark Horowitz, "Self–Timed Logic Using Current–Sensing Completion Detection (CSCD)," Computer Systems Laboratory, Stanford University, CA, IEEE, 1991, pp. 187–191.

Wong, Bennett C. & Henry Samueli, "A 200–MHz All–Digital QAM Modulator and Demodulator in 1.2– m CMOS for Digital Radio Applications," IEEE Journal of Solid–State Circuits, vol. 26, No. 12, Dec. 1991, pp. 1971–1983.

Samueli, Henry, Charles P. Reames, Leo Mritreuil & William E. Wall, "Performance Results of a 64/256–QAM CATV Receiver Chip Set," Broadcom Corp., Los Angeles, CA & Scientific–Atlanta Inc., Norcross, GA.

Patent Abstracts of Japan, vol. 8, No. 175, (P–294), Aug. 11, 1984, & JP 59–068829.

*Primary Examiner*—W. R. Young
*Attorney, Agent, or Firm*—Keiji Masaki; Donald Bollella; Clay E. Gaetje

[57] ABSTRACT

The present invention allows the light beam of an optical disc storage device to radially move between different information tracks of an optical disc while the storage device tracking servo loop remains in a continuous closed loop mode of operation. The invention operates to radially move a light beam from one information track to another during a closed loop mode of operation by activating two control signals introduced into the closed tracking servo loop to create a phantom track center that radially moves across the optical disc. Because the tracking servo loop is in a closed loop mode of operation, the tracking servo operates to keep the light beam centered on the point that the tracking servo considers to be the center of an information track; in this case the phantom track center. Therefore, the tracking servo causes the light beam to radially move across the disc in a closed loop mode of operation by keeping the light beam centered on the moving phantom track center.

6 Claims, 6 Drawing Sheets

U.S. PATENT DOCUMENTS

| | | |
|---|---|---|
| 3,794,410 | 2/1974 | Elliott . |
| 3,829,622 | 8/1974 | Elliot . |
| 3,908,076 | 9/1975 | Broadbent . |
| 3,908,080 | 9/1975 | Broadbent . |
| 3,914,541 | 10/1975 | Elliott . |
| 3,924,062 | 12/1975 | Broadbent . |
| 3,932,700 | 1/1976 | Snopko . |
| 3,944,727 | 3/1976 | Elliott . |
| 3,997,715 | 12/1976 | Elliott . |
| 4,118,735 | 10/1978 | Wilkinson . |
| 4,152,586 | 5/1979 | Elliott et al. . |
| 4,161,752 | 7/1979 | Basilico . |
| 4,161,753 | 7/1979 | Bailey et al. . |
| 4,190,860 | 2/1980 | Somers et al. . |
| 4,225,873 | 9/1980 | Winslow . |
| 4,228,326 | 10/1980 | Dakin et al. . |
| 4,232,201 | 11/1980 | Canino . |
| 4,232,337 | 11/1980 | Winslow et al. . |
| 4,234,837 | 11/1980 | Winslow . |
| 4,236,105 | 11/1980 | Wilkinson . |
| 4,239,942 | 12/1980 | Van Alem et al. . |
| 4,252,327 | 2/1981 | Elliott et al. . |
| 4,271,334 | 6/1981 | Yardy . |
| 4,282,598 | 8/1981 | Elliott . |
| 4,310,919 | 1/1982 | Slaten . |
| 4,322,837 | 3/1982 | Mickleson et al. . |
| 4,337,534 | 6/1982 | Basilico et al. ........................ 369/111 |
| 4,337,538 | 6/1982 | Wilkinson et al. ..................... 369/223 |
| 4,340,955 | 7/1982 | Elliott ..................... 369/213 |
| 4,347,599 | 8/1982 | Vitale ..................... 369/270 |
| 4,353,090 | 10/1982 | Broadbent . |
| 4,357,533 | 11/1982 | Winslow . |
| 4,358,774 | 11/1982 | Wilkinson . |
| 4,358,796 | 11/1982 | Ceshkovsky et al. . |
| 4,358,802 | 11/1982 | Jarsen ........................ 360/99 |
| 4,367,545 | 1/1983 | Elliott ..................... 369/213 |
| 4,370,679 | 1/1983 | Ceshkovsky et al. . |
| 4,371,899 | 2/1983 | Ceshkovsky et al. . |
| 4,374,323 | 2/1983 | Winslow et al. . |
| 4,375,091 | 2/1983 | Dakin et al. ..................... 369/32 |
| 4,397,805 | 8/1983 | Holmes . |
| 4,406,000 | 9/1983 | Shoji et al. . |
| 4,412,743 | 11/1983 | Eberly . |
| 4,414,655 | 11/1983 | Shoji et al. . |
| 4,439,848 | 3/1984 | Ceshkovsky et al. . |
| 4,445,144 | 4/1984 | Giddings . |
| 4,445,209 | 4/1984 | Mickelson et al. . |
| 4,450,488 | 5/1984 | Golding . |
| 4,451,913 | 5/1984 | Elliott ..................... 369/110 |
| 4,456,914 | 6/1984 | Winslow . |
| 4,463,389 | 7/1984 | Golding . |
| 4,465,977 | 8/1984 | Lopez de Romana . |
| 4,467,467 | 8/1984 | Wilkinson et al. ..................... 369/111 |
| 4,477,890 | 10/1984 | Mooney et al. ........................ 369/53 |
| 4,481,613 | 11/1984 | Yokota ..................... 369/56 |
| 4,488,279 | 12/1984 | Wilkinson et al. ........................ 369/54 |
| 4,492,992 | 1/1985 | Rooney et al. . |
| 4,499,569 | 2/1985 | Lopez De Romana . |
| 4,504,939 | 3/1985 | Eberly . |
| 4,514,771 | 4/1985 | Stark et al. . |
| 4,516,177 | 5/1985 | Moon et al. . |
| 4,519,004 | 5/1985 | Wilkinson et al. . |
| 4,530,018 | 7/1985 | Hoshino et al. . |
| 4,530,083 | 7/1985 | Ishihara ..................... 369/267 |
| 4,536,863 | 8/1985 | Giddings . |
| 4,546,460 | 10/1985 | Ando . |
| 4,566,090 | 1/1986 | Eberly . |
| 4,571,712 | 2/1986 | Romano et al. . |
| 4,571,716 | 2/1986 | Szerlip ..................... 369/54 |
| 4,583,131 | 4/1986 | Dakin . |
| 4,583,210 | 4/1986 | Winslow ..................... 369/54 |
| 4,589,103 | 5/1986 | Tajima . |
| 4,590,527 | 5/1986 | Warner . |
| 4,607,157 | 8/1986 | Millar et al. . |
| 4,607,956 | 8/1986 | Ishihara et al. . |
| 4,611,318 | 9/1986 | Winslow ..................... 369/54 |
| 4,638,377 | 1/1987 | Dakin . |
| 4,648,084 | 3/1987 | Eberly . |
| 4,651,314 | 3/1987 | Yoshikawa et al. ..................... 369/45 |
| 4,700,334 | 10/1987 | Shinkai . |
| 4,701,898 | 10/1987 | Giddings ..................... 369/32 |
| 4,703,368 | 10/1987 | Dakin . |
| 4,703,467 | 10/1987 | Elliott . |
| 4,706,133 | 11/1987 | Giddings . |
| 4,727,433 | 2/1988 | Dakin . |
| 4,727,532 | 2/1988 | Giddings . |
| 4,751,692 | 6/1988 | Giddings ..................... 369/32 |
| 4,757,393 | 7/1988 | Dakin et al. . |
| 4,759,007 | 7/1988 | Eberly ..................... 369/58 |
| 4,774,699 | 9/1988 | Giddings ..................... 369/32 |
| 4,779,251 | 10/1988 | Burroughs . |
| 4,791,289 | 12/1988 | Watanabe et al. . |
| 4,796,098 | 1/1989 | Giddings . |
| 4,797,866 | 1/1989 | Yoshikawa . |
| 4,809,247 | 2/1989 | Elliott . |
| 4,845,697 | 7/1989 | Giddings ..................... 369/32 |
| 4,853,918 | 8/1989 | Kobayashi et al. . |
| 4,855,978 | 8/1989 | Kanamaru ..................... 369/32 |
| 4,866,695 | 9/1989 | Suzuki et al. ..................... 369/266 |
| 4,893,297 | 1/1990 | Gregg . |
| 4,924,455 | 5/1990 | Fujiie et al. ..................... 369/44.21 |
| 4,939,712 | 7/1990 | Abe et al. ..................... 369/32 |
| 4,950,890 | 8/1990 | Gelbart . |
| 4,980,876 | 12/1990 | Abate et al. ..................... 369/44.11 |
| 4,980,878 | 12/1990 | Szerlip ..................... 369/54 |
| 5,012,363 | 4/1991 | Mine et al. ..................... 360/77.05 |
| 5,018,020 | 5/1991 | Dakin . |
| 5,036,506 | 7/1991 | Bierhoff ..................... 369/44.28 |
| 5,079,756 | 1/1992 | Kuwabara ..................... 369/44.28 |
| 5,086,419 | 2/1992 | Yanagi ..................... 369/32 |
| 5,087,973 | 2/1992 | Citta et al. . |
| 5,124,964 | 6/1992 | Hayashi ..................... 369/44.11 |
| 5,138,594 | 8/1992 | Fennema et al. ..................... 369/44.29 |
| 5,146,442 | 9/1992 | Shikichi ..................... 369/44.29 |
| 5,166,915 | 11/1992 | Fuldner et al. ..................... 369/44.28 |
| 5,168,356 | 12/1992 | Acampora et al. . |
| 5,168,486 | 12/1992 | Yanagawa ..................... 369/44.14 |
| 5,170,384 | 12/1992 | Edahiro et al. ..................... 369/44.28 |
| 5,170,386 | 12/1992 | Tateishi ..................... 369/50 |
| 5,177,725 | 1/1993 | Terashi ..................... 369/44.29 |
| 5,179,485 | 1/1993 | Tamayama ..................... 360/106 |
| 5,189,293 | 2/1993 | Leenknegt ..................... 250/201.5 |
| 5,210,726 | 5/1993 | Jackson et al. ..................... 369/32 |
| 5,216,647 | 6/1993 | Kitani ..................... 369/44.28 |
| 5,218,588 | 6/1993 | Suzuki ..................... 369/44.27 |
| 5,247,501 | 9/1993 | Hashimoto et al. ..................... 369/44.11 |
| 5,251,194 | 10/1993 | Yoshimoto et al. . |
| 5,255,253 | 10/1993 | Kagami et al. ..................... 369/44.28 |
| 5,257,251 | 10/1993 | Chow et al. ..................... 369/44.25 |
| 5,267,226 | 11/1993 | Matsuoka et al. ..................... 369/44.11 |
| 5,270,886 | 12/1993 | Nigam ..................... 360/78.05 |
| 5,294,894 | 3/1994 | Gebara . |
| 5,304,953 | 4/1994 | Heim et al. . |
| 5,315,372 | 5/1994 | Tsai . |
| 5,315,571 | 5/1994 | Maeda et al. ..................... 369/50 |
| 5,319,622 | 6/1994 | Martin ..................... 369/44.14 |
| 5,327,407 | 7/1994 | Suzuki et al. ..................... 369/44.25 |
| 5,353,247 | 10/1994 | Faris ..................... 365/108 |
| 5,379,282 | 1/1995 | Wachi ..................... 369/44.35 |
| 5,394,385 | 2/1995 | Sakurada et al. ..................... 369/44.23 |
| 5,396,477 | 3/1995 | Matsumoto et al. ..................... 369/44.28 |
| 5,459,309 | 10/1995 | Kagami et al. ..................... 250/201.5 |
| 5,590,102 | 12/1996 | Ceshkovsky ..................... 369/44.11 |

TECHNIQUE FOR CLOSED LOOP SERVO OPERATION IN OPTICAL DISC TRACKING CONTROL

FIELD OF THE INVENTION

This invention generally relates to an improved method and apparatus for optical disc tracking control in an optical disc storage device. Particularly, the present invention relates to radially moving a light beam that is tracking an information track on an optical disc to another information track on the optical disc in a controlled fashion while the storage device tracking servo loop is in a closed mode of operation.

BACKGROUND OF THE INVENTION

An optical disc storage device can be either a device or system that is capable of retrieving information stored by an optical disc, or a device or system that is capable of both recording information to and retrieving information from an optical disc. Examples of optical disc storage devices that are capable of retrieving information from an optical disc include compact disc (CD) players, video laser disc (L) players and compact disc read-only-memory (CD-Rom) drives. Examples of optical disc storage devices that are capable of both recording information to an optical disc and retrieving information from an optical disc include recordable mini-disc (MD) players, magneto-optical (MO) disc drives and compact disc recordable (CD-R) drives.

Information is generally stored by an optical disc in the form of concentric or spiral tracks sometimes referred to as information tracks. In the case where information is already stored by an optical disc, the information tracks contain regions of optical contrast that represent the stored information. In the case of an unrecorded or blank optical disc containing per-formatted tracks for recording information, a track that will become an information track may or may not have regions of optical contrast. The area located between two information tracks on an optical disc is sometimes referred to as a non-information track.

When an optical storage device is in its normal mode of operation, i.e. retrieving information from or recording information to an optical disc, the storage device rotates the disc while using a light beam to retrieve information from or record information to the disc. As the optical disc rotates, the light beam radially traverses the disc. While the light beam traverses the optical disc, a tracking servo loop in the optical disc storage device keeps the beam of light centered on the information track, or the track that will become the information track in the case of recording information to a disc.

An optical disc tracking servo is a closed loop system that allows a light beam to remain centered on an optical disc information track during normal operation of an optical disc storage device. The tracking servo readjusts the radial position of the light beam by sensing when the light beam drifts off the center of the information track. The tracking servo senses when the light beam is not centered on an information track by measuring the intensity of light reflected by the surface of the optical disc.

Generally, the intensity of light reflected by the surface of an optical disc is the least when it is reflected by the center of an information track. Using this principle, a tracking servo generally senses the intensity of light reflected at one or both edges of an information track to detect when a light beam is drifting off center and to determine in which direction the light beam is drifting. Therefore, a tracking servo system that is in a closed loop mode of operation senses when the light beam floats off the center of the information track by detecting changes in the intensity of light reflected at one or both edges of an information track and moves the beam back into a position where the intensity of reflected light is optimal for center tracking.

In the case where a tracking servo measures the intensity of light reflected at both edges of an information track, the intensity of reflected light that is optimal for center tracking occurs when the intensity of light reflected at both edges of an information track is the same. The same principle holds true for both one and three beam optical disc storage devices. In the case where a tracking servo measures the intensity of light reflected at one edge of an information track, the intensity of reflected light that is optimal for center tracking is based on some calibrated value. The latter method is less favored due to difficulties associated with calibrating an appropriate centering value.

Optical disc storage devices are generally capable of performing various special operations to assist in positioning the light beam on the optical disc. These special functions are generally outside of the normal mode of operation of the storage device and include such operations as PAUSE, or still mode, and SEARCH, or seek mode. A PAUSE operation causes the light beam of a storage device to jump to an adjacent information track on the optical disc so that the most recently processed information is processed again by the storage device. A PAUSE operation gives the appearance of suspending normal operation of the storage device. The duration that operation of the storage device appears to be suspended depends on how many successive PAUSE operations are initiated such that the same information is repeatedly processed.

During a SEARCH operation, the optical storage device typically searches for a specific target track address on an optical disc. Achieving a search operation may require the light beam to radially cross several information tracks before the target address is found. Once the target address is found, the optical disc storage device can return to its normal mode of retrieving or recording information.

An optical disc storage devices typically performs a PAUSE or SEARCH operation, by disengaging the tracking servo loop for some period of time during the PAUSE or SEARCH operation. When the tracking servo loop is disengaged it is no longer closed and is referred to as being in an open loop mode, or simply that the loop is open. The tracking servo loop is disengaged (or open) during a PAUSE or SEARCH operation to allow the beam to freely move between information tracks. Keeping the tracking servo loop engaged (or closed) while attempting to move the beam between information tracks during a PAUSE or SEARCH operation would frustrate such attempted operations, because the tracking servo system would attempt to keep the beam centered on the information track. Therefore, optical storage devices generally keep the tracking servo loop open during some portion of a PAUSE or SEARCH operation.

As alluded to above, sending an overriding signal to a tracking servo to radially move a light beam across an optical disc while the tracking servo loop is closed would result in an inefficient or frustrated PAUSE or SEARCH operation. While more efficient than the latter, opening and closing a tracking servo loop while performing a PAUSE or SEARCH operation has a disadvantage of using up time that could otherwise be used by the optical disc storage device during its normal operating mode of retrieving or recording information.

One attempt to improve the efficiency of a seek operation proposes moving an optical head radially across a disc according to the characteristics of a seek profile signal that is supplied to the track positioning component of a tracking servo system independently from data read off the disc. Periodically sampled differences between the actual head position and the independently supplied seek profile signal are used to drive the track positioning component of the tracking servo system to adjust the head position so that the desired seek profile is maintained. Examples of seek operations that propose using an independently supplied seek profile signal and sampling can be seen in U.S. Pat. Nos. 4,980,876 and 5,210,726.

A disadvantage of the above proposed seek method, however, is that time is still expended sampling and adjusting differences between the actual head position and the independently supplied seek profile signal. Another disadvantage is that the above proposed seek method is susceptible to unpredicted noise and transients between sampling.

SUMMARY OF THE INVENTION

The present invention allows the light beam of an optical disc storage device to radially move between different information tracks of an optical disc while the storage device tracking servo loop remains in a substantially continuous closed loop mode of operation. The invention operates to radially move a light beam from one information track to another during a closed loop mode of operation by activating two control signals introduced into the closed tracking servo loop to create a phantom track center that radially moves across the optical disc. Because the tracking servo loop is in a closed loop mode of operation, the tracking servo operates to keep the light beam centered on the point that the tracking servo considers to be the center of an information track; in this case the phantom track center. Therefore, the tracking servo causes the light beam to radially move across the disc in a closed loop mode of operation by keeping the light beam centered on the moving phantom track center.

The phantom track center is created by multiplying the two activated control signals with two tracking servo loop feedback signals to produce two modified feedback signals. The phantom track center radially moves across the disc by independently varying the voltages of the two control signals in a predefined manner. The two modified feedback signals are compared to each other with an operational amplifier to generate an error signal that is supplied to the track positioning component of the closed tracking servo loop. The error signal has the effect of attempting to cause the tracking servo to position the light beam over the phantom track center while at the same time moving the phantom track center, thus causing the light beam to radially move across the optical disc.

The feedback signals are the same signals that provide information about the position of a light beam relative to the center of an information track during normal closed loop tracking. However, when the control signals are activated, the feedback signals provide information about the position of the light beam relative to the phantom track center as the phantom track center radially moves across the optical disc. The position of the light beam relative to the phantom track center is supplied by the feedback signals and multiplied with the control signals to produce the two modified feedback signals, thus completing the loop. The process is continuously repeated thereby creating a closed tracking servo loop that radially moves a beam of light from one information track to another.

DETAILED DESCRIPTION OF THE INVENTION

1. Fundamental Principles of the Invention

The following fundament principles underlying the present invention are provided to assist the reader in gaining a full appreciation for the invention.

Figure 1:
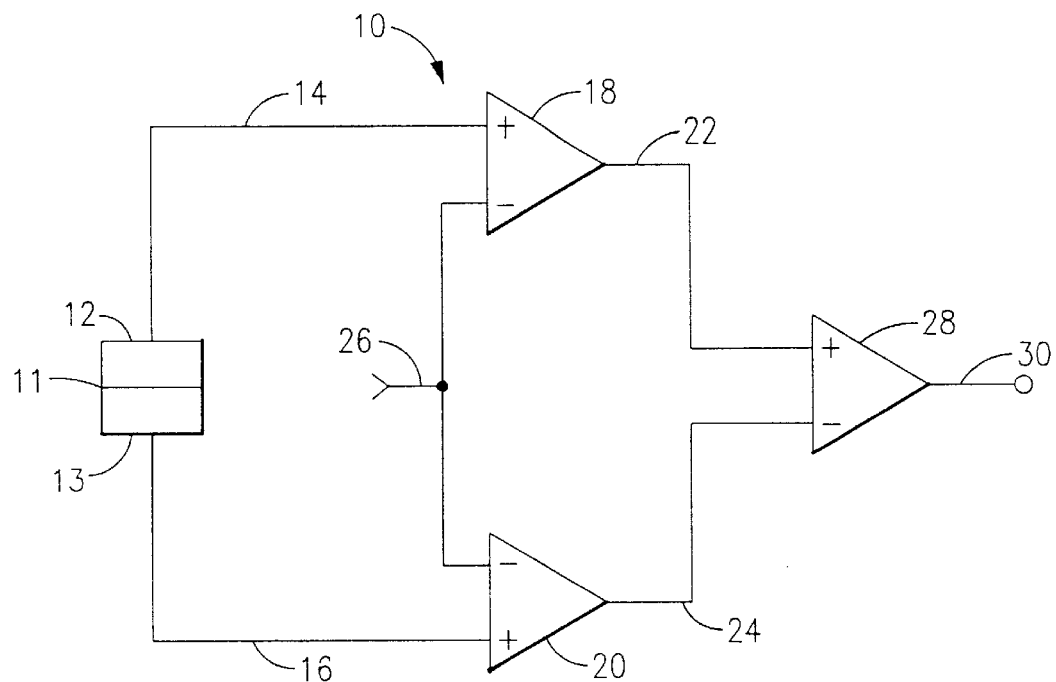
FIG. 1 is a partial circuit diagram of a conventional tracking error detection apparatus for use in an optical disc storage device.

Referring to FIG. 1, there is shown a partial circuit diagram for a conventional tracking error detection apparatus 10. Tracking error detection apparatus 10 employs a photo detector unit 11. Photo detector unit 11 comprises two components, a first photo detector component 12, and a second photo detector component 13. Photo detector unit 11 performs the operation of measuring the intensity of light reflected by an optical disc. When an optical disc storage device tracks an information track in a closed loop tracking mode, first photo detector component 12 measures the intensity of light reflected at or near one of the edges of the information track being followed. Second photo detector component 13 measures the intensity of light reflected at or near the other edge of the information track being followed. First photo detector component 12 transmits an electrical signal on a signal 14 that is representative of the intensity of the reflected light measured by photo detector 12. Second photo detector component 13 transmits an electrical signal on a signal 16 that is representative of the intensity of the reflected light measured by photo detector 13.

Signal 14 is coupled to the positive pole of operational amplifier 18. Operational amplifier 18 amplifies and transmits signal 14 as a signal 22. Signal 16 is coupled to the positive pole of operational amplifier 20. Operational amplifier 20 amplifies and transmits signal 16 as signal 24. Signal 26 is a voltage common mode (VCM) signal that is coupled to the negative poles of operational amplifiers 18 and 20. Signal 22 is coupled to the positive pole of difference-summing amplifier 28 and signal 24 is coupled to the negative pole of difference-summing amplifier 28.

Difference-summing amplifier 28 operates as a comparator and generates a tracking error signal 30 that represents voltage level differences between signals 22 and 24.

When a light beam is perfectly centered on an information track in an optical disc storage device using tracking error detection apparatus 10, the intensity of reflected light measured by first photo detector component 12 is equal to the intensity of reflected light measured by second photo detector component 13. Consequently, the voltage levels of signal 22 and 24 are the same, and difference-summing amplifier 28 generates tracking error signal 30 with a voltage level that represents a nominal light beam position on the center of an information track. The voltage level that represents nominal light beam positioning in most tracking servo systems is approximately zero volts. When the light beam starts to drift off the center of the information track being followed, the intensity of reflected light measured by first photo detector component 12 and second photo detector component 13 is different. Consequently, the voltage levels of signal 22 and 24 are different, and difference-summing amplifier 28 generates a tracking error signal 30 that has a voltage level either greater than zero or less than zero, depending on the direction the light beam has drifted off the center of the information track. With this principle in mind, it can be appreciated that difference-summing amplifier 28 generates tracking error signal 30 with a voltage signal response similar to tracking error signal 31 shown in FIG. 2, as a light beam radially moves across an optical disc with a tracking servo in open loop mode.

Figure 2:
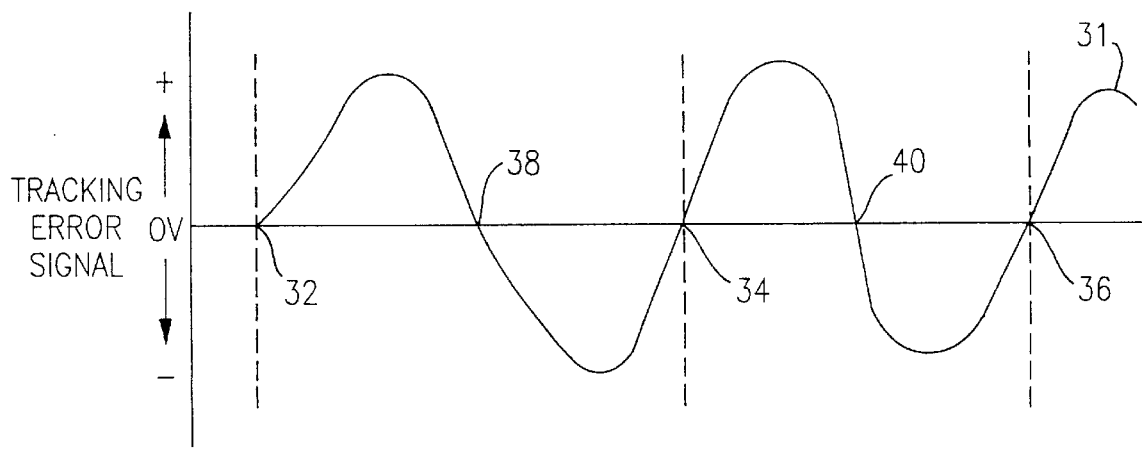
FIG. 2 illustrates an example of a tracking error signal when a light beam radially moves across an optical disc when the tracking servo loop is an open mode of operation.

Referring to FIG. 2, there is shown a plot of a tracking error signal 31, where the horizontal axis represents the radial position of a light beam on an optical disc, and the vertical axis is a voltage level that is representative of the distance the light beam is from either the center of an information track or the center of a non-information track. For example, the light beam is on the center of an information track at points 32, 34, and 36. Alternatively, the light beam is on the center of a non-information track at points 38 and 40. Therefore, it can be seen that the tracking error signal is approximately sinusoidal in nature when the light beam radially crosses the optical disc in an open tracking loop mode. It can also be seen that one cycle of the sinusoidal tracking error signal corresponds to moving a light beam one information track on the optical disc.

Figure 3:
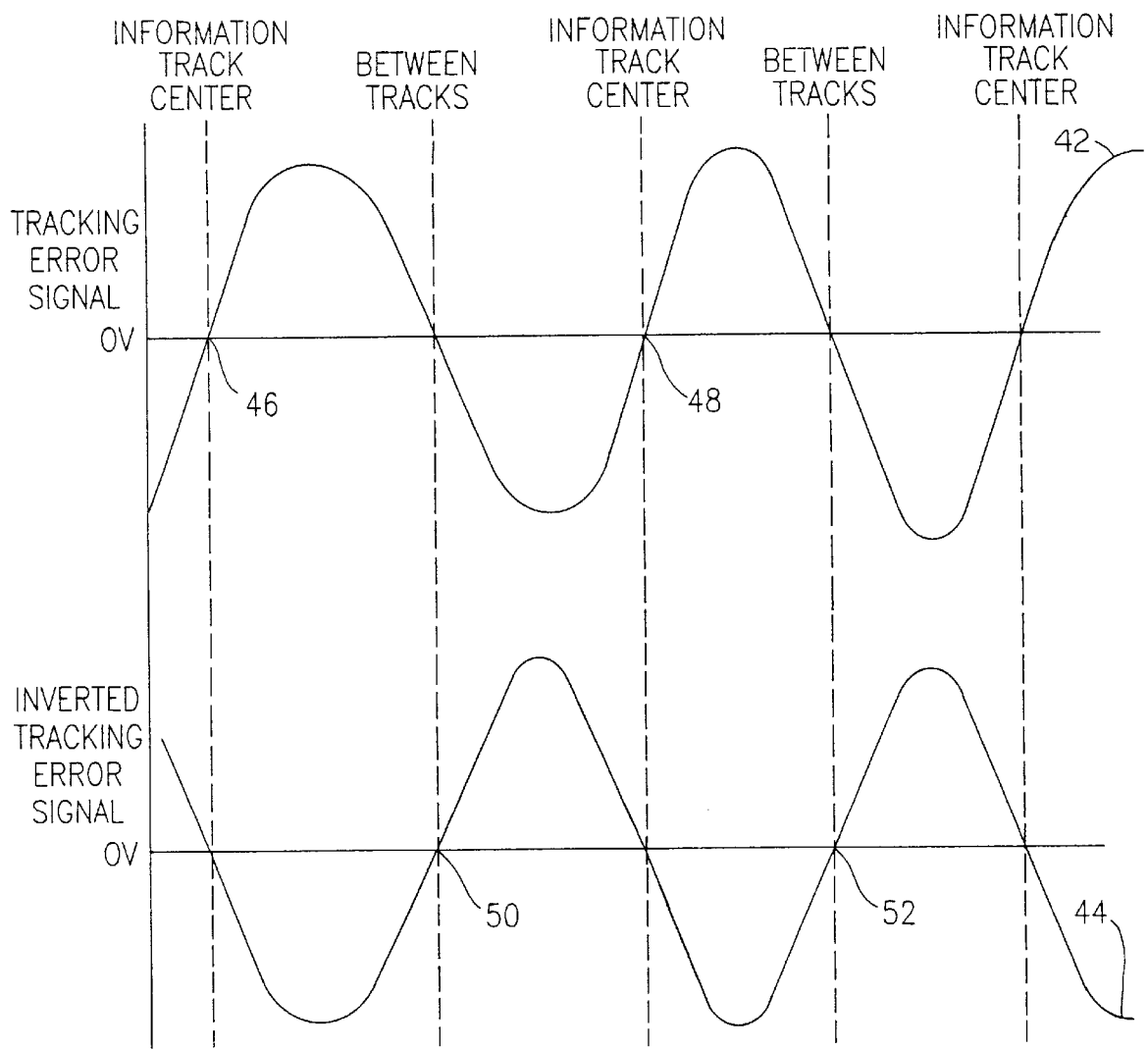
FIG. 3 depicts the tracking error signal in FIG. 2 and an inverted tracking error signal of FIG. 2.

Referring to FIG. 3, there is shown a tracking error signal 42 and an inverted tracking error signal 44. Tracking error signal 42 is identical to tracking error signal 31 shown in FIG. 2. Points 46 and 48 on tracking error signal 42 represent when the light beam is on the center of an information track. It should be observed that the light beam is on an information track when the positive slope of the sinusoidal tracking error signal crosses the horizontal axis. Alternatively, the light beam is located on the center of a non-information track, i.e., exactly between information tracks, when the negative slope of the sinusoidal tracking error signal crosses the horizontal axis.

It is well recognized that a sinusoidal signal can be inverted by multiplying it by a negative one. It can be observed that inverted tracking error signal 44, therefore, represents an inversion of tracking error signal 42. It should also be observed that the positive sinusoidal slope of the inverted track signal crosses the horizontal axis at points 50 and 52. Points 50 and 52 of inverted tracking error signal 44, however, indicate that the light beam is centered on the non-information track. Therefore, it should be observed that multiplying the tracking error signal by a negative one moves a point that would ordinarily represent the center of an information track to a point that represents the center of a non-information track. Consequently, inverting a tracking error signal has the ultimate effect of positioning a light beam on a point that it believes the center of an information track, i.e., an apparent information track center or a phantom track center. This is a basic underlying principle upon which the present invention operates.

Figure 4:
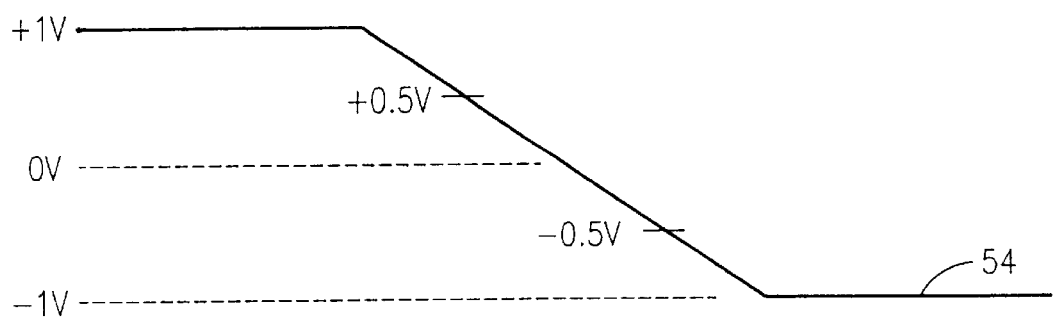
FIG. 4 is a voltage signal curve that linearly varies voltage between +1 volt and −1 volt.

Referring to FIG. 4, there is shown a voltage signal curve 54 that linearly varies voltage between +1 volt and −1 volt. It should be apparent that multiplying tracking error signal 42 with voltage signal curve 54, as its voltage level varies from +1 volts to −1 volts, generates inverted tracking error signal 44. Applying this principle in practice, however, presents two problems that prevent using this method to cause a light beam to radially move across an optical disc while the tracking servo loop is closed. The first problem occurs when voltage signal curve 54 reaches approximately 0 volts. Generally, tracking servos become non-operational and lose control when the tracking error signal, or gain, falls within a certain voltage range; typically around zero volts, plus or minus some differential.

The second problem associated with inverting a tracking error signal is that continuous unidirectional radial movement of the light beam across the disc while the tracking servo loop is closed cannot be assured. Recall that inverting a tracking error signal while the tracking loop is closed has the effect of moving an apparent center of an information disc to the center of an adjacent non-information track. However, once the tracking error signal is inverted, the light beam is on the negative slope of the sinusoidal tracking error signal, causing the light beam to think that it is on the center of a non-information track. A light beam on the center of a non-information track is unstable and can move in either direction because it does not know which adjacent information track it should try to center itself over. Therefore, the principle of inverting a tracking error signal by multiplying it by −1 volt to move an apparent information track center on an optical disc serves merely to illustrate one of the principles underlying the operation of the present invention.

Figure 5:
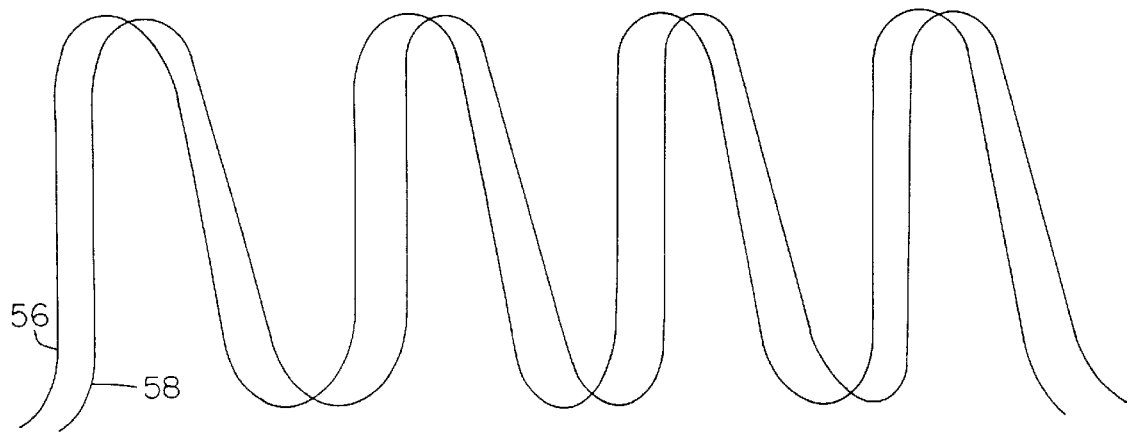
FIG. 5 is a plot of two component signals that make up a tracking error signal when subtracted from each other.

To solve the problems associated with inverting a tracking error signal as described above, the present invention applies the same signal inverting principle described above to cause a phase shift in the component signals that make up the tracking error signal. That is, the present invention inverts signals 22 and 24, shown in FIG. 1. Still referring to FIG. 1, it can be recalled that the difference-summing amp 28 uses signals 22 and 24 to generate tracking error signal 30. Referring now to FIG. 5, there is shown a typical sample plot of signals 56 and 58. Signals 56 and 58 depict a graphic representation of the signals generated by signals 22 and 24 in FIG. 1 when a light beam is radially moved across an optical disc. Subtracting signal 58 from signal 56 produces a tracking error signal similar to tracking error signal 31 shown in FIG. 2.

Figure 6:
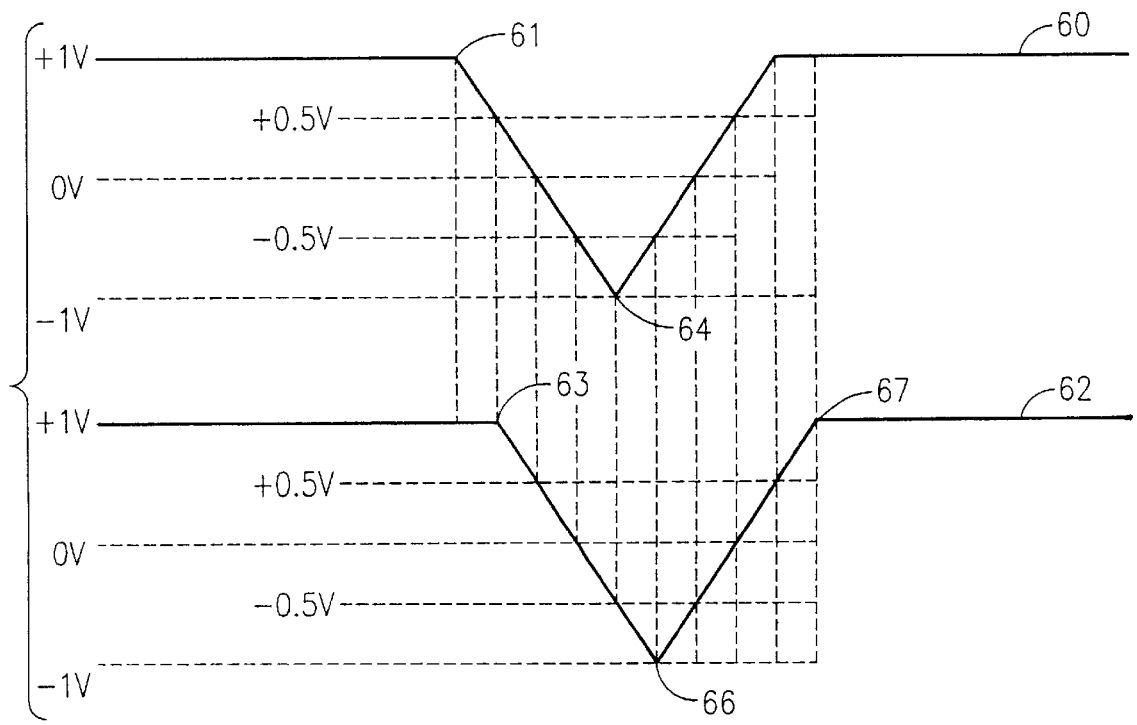
FIG. 6 illustrates an example of staggered control signals that when multiplied by the component signals of a tracking error signal cause a light beam to radially move across a disc while the tracking servo is in a closed loop mode of operation.

Referring to FIG. 6, there are shown two voltage control signals 60 and 62. Control signals 60 and 62 can be used to invert signals 22 and 24, shown in FIG. 1. For example, inverting signals 22 and 24 can be achieved by multiplying signal 22 by signal 60, and by multiplying signal 24 by signal 62. Control signals 60 and 62 invert signals 22 and 24 in a manner that the tracking servo never senses a gain value that would cause the tracking servo to become non-operational. Again, it will be recalled that a gain value of approximately zero volts, plus or minus some differential, renders a tracking servo non-operational. One method of ensuring that the tracking servo never senses a gain value of approximately 0 volts is by never allowing both control signals 60 and 62 to have a voltage level of 0 volts at the same time. This can be achieved by slightly staggering the time points when each signal starts to change its voltage between +1 volt and −1 volt. The staggered time points referred to are depicted at points 61 and 63.

In FIG. 6, it can be observed that control signal 60 varies its voltage from +1 volt to +0.5 volts as control signal 62 maintains a value of +1 volt. Control signal 60 varies its voltage from +0.5 volts to 0 volts as control signal 62 varies its voltage from +1 volt to +0.5 volts. Control signal 60 varies its voltage from 0 volts to −0.5 volts as control signal 62 varies its voltage from +0.5 volts to 0 volts. Control signal 60 varies it voltage from −0.5 volts to minus −1 volt as control signal 62 varies its voltage from 0 volts to −0.5 volts. Control signal 60 varies its voltage from −1 volt to −0.5 volts as control signal 62 varies its voltage from −0.5 volts to −1 volt. Control signal 60 varies its voltage from −0.5 volts to 0 volts as control signal 62 varies its voltage from −1 volt to −0.5 volts. Control signal 60 varies its voltage from 0 volts to +0.5 volts as control signal 62 varies its voltage from −0.5 volts to 0 volts. Control signal 60 varies its voltage from +0.5 volts to +1 volt as control signal 62 varies its voltage from 0 volts to +0.5 volts. Control signal 60 remains at +1 volt as control signal 62 varies its voltage from +0.5 volts to +1 volt.

It can be seen that at no time do control signals 60 and 62 both have a voltage of approximately 0 volts. This ensures that the tracking servo does not sense a gain value of approximately 0 volts while radially moving a light beam across an optical disc while the tracking servo loop is closed. Therefore, control signals 60 and 62 represent one possible configuration of control signals that can be used to invert signals 22 and 24, shown in FIG. 1, without causing the tracking servo to lose operational control.

Figure 10:
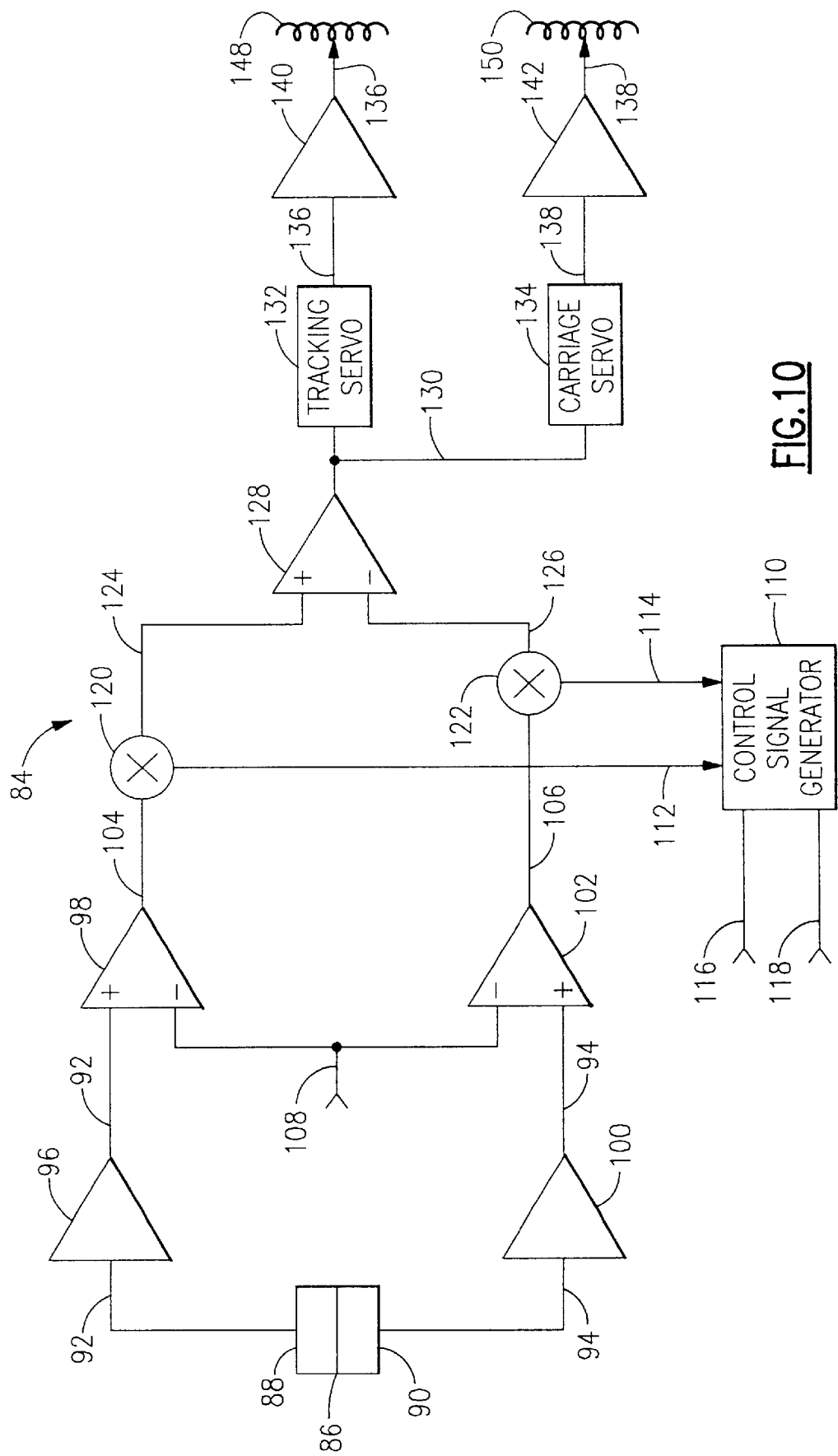
FIG. 10 is a circuit diagram of an embodiment of the present invention.

Staggering starting points 61 and 63 of control signals 60 and 62 also serves to maintain continuous unidirectional movement of the light beam as it radially moves across an optical disc when the tracking servo loop is closed. It should be recognized that both control signals 60 and 62 have a constant voltage level of +1 volt prior to time point 61 on control signal 60. It should also be recognized that multiplying control signals 22 and 24, shown in FIG. 1, by +1 volt has no affect on the voltage levels of control signals 22 and 24, since multiplying by the quantity 1 is an identity function. Therefore, it can be recognized that control signals 60 and 62 are inactive prior to time point 61 when respectively multiplied with signals 22 and 24. (Note: The schematic circuit diagram of the present invention showing how control signals similar to control signals 60 and 62, shown in FIG. 6, are multiplied with signals in a tracking servo loop similar to signals 22 and 24, shown in FIG. 1, is depicted in FIG. 10, and is discussed in detail in the next section.)

Control signal 60, becomes active just after time point 61 when control signal 60 starts to change its voltage from +1 volt to −1 volt. Control signal 62, becomes active just after time point 63 when control signal 62 starts to change its voltage from +1 volt to −1 volt. Essentially, a closed loop tracking operation of radially moving a light beam across an optical disc becomes activated when either of the two control signals 60 or 62 first starts changing their voltage from +1 volt to −1 volt. In FIG. 6, therefore, a closed loop tracking operation of radially moving a light beam across an optical disc becomes activated immediately after time point 61.

When a closed loop tracking operation for radially moving a light beam across an optical disc is activated by control signals similar to control signals 60 and 62, the process of creating an apparent information track center, or phantom track center, that moves radially across the optical disc begins. The phantom track center is created for the reasons discussed above, i.e., the signal responses of component signals 22 and 24, shown in FIG. 1 and graphically depicted as signals 56 and 58 in FIG. 5, that make up the tracking error signal are gradually inverted. However, the staggered fashion in which the signal responses of signals 22 and 24 are inverted by control signals 60 and 62, causes a continuous phase shift in the tracking error signal response of tracking error signal 30, shown in FIG. 1. The induced phase shift has the effect of radially moving the phantom track center across an optical disc. Because the tracking servo loop is closed, the tracking servo attempts to keep the light beam aligned on the phantom track center, thereby causing the light beam to radially move across the optical disc.

Figure 7:
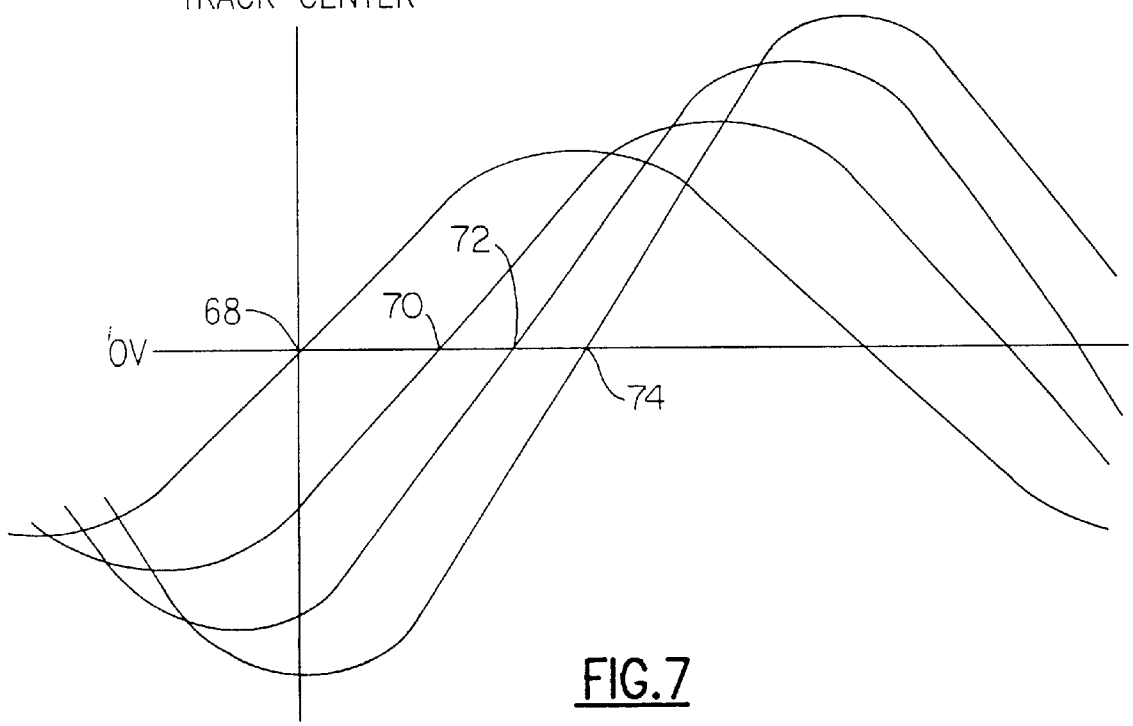
FIG. 7 is a conceptual illustration of how a phantom track center moves across an optical disc.

Referring to FIG. 7, there is shown a conceptual illustration of a tracking error signal at different points in time while control signals similar to control signals 60 and 62, shown in FIG. 6, are active. Point 68 depicts the actual center of an information track. Points 70, 72 and 74 depict phantom track centers on the same tracking error signal at different points in time when a closed loop tracking operation of radially moving the light beam across an optical disc is active. It should be emphasized that the tracking error signals in FIG. 7 do not represent a real signal response since the tracking servo loop is in a closed loop mode of operation. Therefore, the tracking signal error response signal depicted in FIG. 7 is an ideal signal that is merely presented for demonstrative purposes only.

The staggered configuration of control signals 60 and 62, shown in FIG. 6, also causes a phantom track center, and consequently the light beam, to become aligned with the actual center of the next information track when control signals 60 and 62 both return to +1 volt and the closed tracking loop radial move operation becomes inactive. The phantom track center becomes aligned on the center of the next information track when control signals 60 and 62 both return to +1 volt for two reasons. First, it can be recalled that inverting a tracking error signal, i.e., multiplying a tracking error signal by −1, aligns the phantom track center with the center of an adjacent non-information track. The same principle holds true when control signals 60 and 62 are multiplied by the signal responses of signals 22 and 24, shown in FIG. 1, with the slight variation that the phantom track center becomes aligned on the center of an adjacent information track at the time point that is half way between the time points that control signals 60 and 62 reach −1 volt. The reason that the phantom track center becomes aligned at that time is because of the staggered configurations of control signals 60 and 62.

The second reason the phantom track center becomes aligned on the center of the next information track when control signals 60 and 62 both return to +1 volt is as follows. It will be remembered that the staggered nature of control signals 60 and 62 induces a continuous phase shift of the tracking error signal that causes the phantom track center to radially move across an optical disc. The same principle holds true when control signals 60 and 62 change their voltages from −1 volt to +1 volt, because control signals 60 and 62 remain staggered in the same fashion as when they changed their voltages from +1 volt to −1 volt. In other words, the phantom track center continues to move in the same direction when control signals 60 and 62 change their voltages from −1 volt to +1 volt. Additionally, the time it takes control signals 60 and 62 to change from +1 volt to −1 volt is the same time it takes control signals 60 and 62 to change from −1 volt to +1 volt. Therefore, when the phantom track center reaches the center of the adjacent non-information track, it continues to move in the same direction that it was moving when it arrived at the center of the non-information track, and it travels the same distance that it took to reach the center of the non-information track, thus aligning it with the center of the next information track. Consequently, the light beam is positioned on the next information track.

Therefore, it can be appreciated that activating one complete cycle of control signals 60 and 62 causes the light beam to move one information track. Consequently, the number of tracks that the light beam crosses is determined by the number of control signal cycles produced. One complete active cycle of control signals 60 and 62 is depicted by time points 61 and 67. That is, one complete active cycle of control signals 60 and 62 occurs between the time the first control signal starts to change its voltage from +1 volts to −1 volts, i.e., point 61 on signal 60, and the time the last control signal returns to +1 volt, i.e., point 67 on signal 62. It can also be appreciated that a closed tracking loop operation of radially moving the light beam across an optical disc begins when control signals, similar to control signals 60 and 62, become activated by commencing to change any one control signal's voltage from +1 volt to −1 volt. Lastly, it can be appreciated that the rate at which the light beam moves during an activated closed tracking loop operation for radially moving the light beam across an optical disc is controlled by the cycle time of one complete active cycle for control signals similar to control signals 60 and 62, and is limited only by the acceptable operating range of the employed tracking servo.

The direction that the light beam radially moves across an optical disc during a closed tracking loop radial move operation is dictated by which of the two control signals is the first to commence changing its voltage level from +1 volt to −1 volt. For example, in FIG. 6, control signal 62 would need to start changing its voltage from +1 volt to −1 volt before time point 61 to move the light beam in the opposite direction that the depicted configuration of control signals 60 and 62 would move the light beam.

Linearly changing the voltage of signals 60 and 62 between +1 volt and −1 volt as shown in FIG. 6 creates sharp voltage transitions at points 64 and 66. While control signals 60 and 62 can be used to achieve the desired effect of moving a light beam radially across an optical disc, the sharp voltage transitions at points 64 and 66 cause rough light beam movement as the beam radially crosses the disc. Therefore, control signals that smoothly transition between +1 volts and −1 volts are more desirable because they help create a smoother light beam movement as the beam radially crosses a disc.

Figure 8:
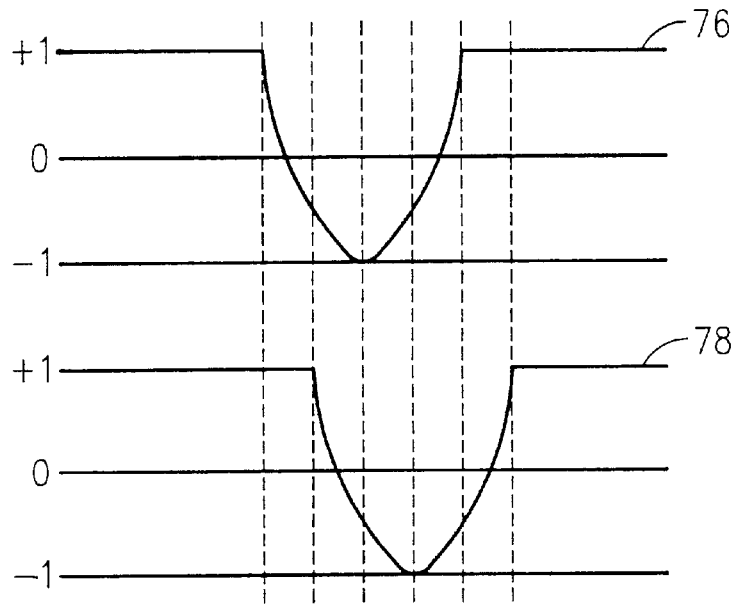
FIG. 8 illustrates an example of staggered control signals that when multiplied by the component signals of a tracking error signal cause a light beam to radially move across a disc while the tracking servo is in a closed loop mode of operation.

Referring to FIG. 8, there is shown an example of two control signals 76 and 78 that smoothly transition between +1 volt and −1 volt. Due to the sinusoidal nature of signals 76 and 78, there are no rough voltage transitions. Therefore, using control signals 76 and 78 is more desirable because the smooth voltage transitions cause a smoother light beam movement radially across an optical disc. Control signals 76 and 78 operate essentially the same as control signals 60 and 62, shown in FIG. 6, in all other respects in the present invention. It should be appreciated that any suitable wave form that smoothly varies control signal voltages between +1 volts and −1 volts can be used to achieve the desired effect of moving a light beam radially across an optical disc in the present invention.

Figure 9:
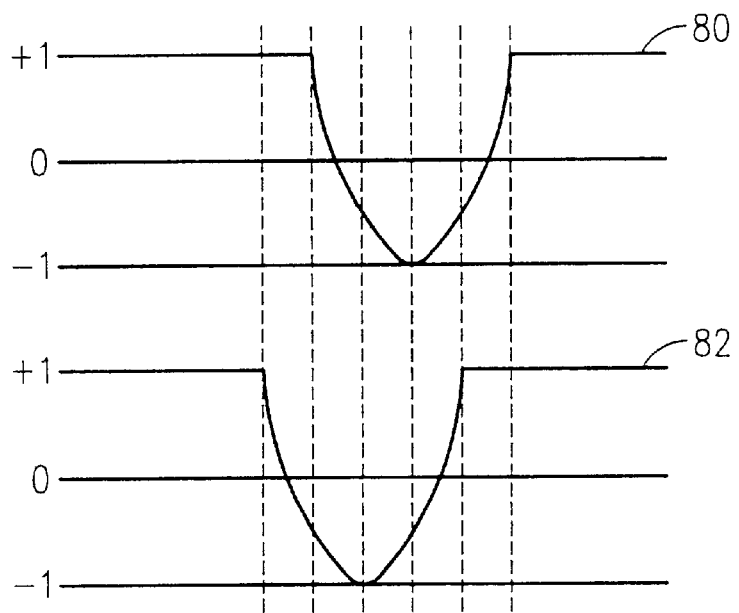
FIG. 9 illustrates an example of staggered control signals that when multiplied by the component signals of a tracking error signal cause a light beam to radially move across a disc in a direction that is opposite of the direction the light beam moves using the control signals in FIG. 8.

Referring to FIG. 9, there is shown control signals 80 and 82. Control signals 80 and 82 depict a control signal configuration that has the effect of radially moving the light beam in the opposite direction that the configuration of control signals 76 and 78, depicted in FIG. 8, radially moves the light beam.

2. Detailed Description of the Preferred Embodiment of the Invention

Referring to FIG. 10, there is shown a schematic diagram of an embodiment of an optical disc tracking control device 84. In optical disc tracking control device 84, there is a photodiode array 86 that has two components, a first photodiode component 88, and a second photodiode component 90. Photodiode array 86 measures the intensity of light reflected by an optical disc. When a light beam is on the center of an information track, first photodiode component 88 measures the intensity of light reflected at or near one of the edges of the tracked information track, and second photodiode component 90 measures the intensity of light reflected at or near the other edge of the tracked information track.

First photodiode component 88 transmits an electrical signal on a first signal 92 that is representative of the intensity of the reflected light measured by photo detector 88. Second photodiode component 90 transmits an electrical signal on a second signal 94 that is representative of the intensity of the reflected light measured by photo detector 90.

First signal 92 is amplified by a first per-amplifier 96 and coupled to the positive pole of a first difference amplifier 98. Second signal 94 is amplified by a second per amplifier 100 and coupled to the positive pole of a second difference amplifier 102. VCM signal 108 is a voltage common mode signal that is coupled to the negative poles of first difference amplifier 98 and second difference amplifier 102. VCM signal 108 may be fixed or it may be variable if derived from a reflectivity signal.

First difference amplifier 98 measures the difference between first signal 92 and VCM signal 108 and transmits a representative voltage level on first feedback signal 104. Second difference amplifier 102 measures the difference between second signal 94 and VCM signal 108 and transmits a voltage level on second feedback signal 106.

Control signal generator 110 has a first control signal 112 and a second control signal 114. Control signal generator also has a directional control signal 116 and a move control signal 118. First feedback signal 104 is multiplied by first control signal 112 using a first multiplier circuit 120 which generates a first modified feedback signal 124. Second feedback signal 106 is multiplied by second control signal 114 using a second multiplier circuit 122 which generates a second modified feedback signal 126.

First modified feedback signal 124 is coupled to the positive pole of difference-summing amplifier 128. Second modified feedback signal 126 is coupled to the negative pole of difference-summing amplifier 128. Difference-summing amplifier 128 acts as a signal comparator and compares the voltage differences between first modified feedback signal 124 and second modified feedback signal 126. Difference-summing amplifier 128 generates a voltage level representative of the voltage difference between first modified feedback signal 124 and second modified feedback signal 126 that is transmitted on tracking error signal 130. Therefore, if the first modified feedback signal 124 has the same voltage as the second modified feedback signal 126, difference-summing amplifier 128 generates a zero voltage that is transmitted on tracking error signal 130. If the voltages of the first feedback signal 124 and the second feedback signal 126 are different, difference-summing amplifier 128 generates a positive or negative voltage level that represents the difference in voltage between first modified feedback signal 124 and second modified feedback signal 126, which is in turn transmitted on tracking error signal 130. It should be appreciated that difference-summing amplifier 128 can be substituted with a pure summing amplifier in the case that either first modified feedback signal 124 or second modified feedback signal 126 is inverted.

Tracking error signal 130 is coupled to both tracking servo 132 and carriage servo 134. Tracking servo 132 can be any tracking servo circuit known to those having ordinary skill in the art that is suitable for performing open and closed loop tracking operations in an optical disc storage device. Carriage servo 134 can be any carriage servo circuit known to those having ordinary skill in the art that is suitable for controlling an optical head carriage in an optical disc storage device.

Tracking servo 132 transmits a tracking servo signal 136 that is processed by a tracking driver 140 and is transmitted to a tracking motor actuator 148 that controls a tracking motor (not shown) for positioning a light beam on an optical disc.

Carriage servo 134 transmits a carriage servo signal 138 the is processed by a carriage driver 142 and is transmitted to a carriage motor actuator 150 that controls a carriage motor (not shown) for an optical head carriage (not shown). It can be appreciated that tracking servo 132 and carriage servo 134 may be combined in the same servo circuit.

3. Operation of the Invention

Optical disc tracking control device 84 has two primary modes of operation that are controlled by move control signal 118 of control signal generator 110. The first mode of operation occurs when move control signal 118 sends a signal that deactivates control signal generator 110. When control signal generator 110 is deactivated, control signal generator 110 generates +1 volt signals on both first control signal 112 and second control signal 114. Deactivating control signal generator 110 has the effect of letting optical disc tracking control device 84 act as a standard tracking servo loop for optical disk storage devices that is well known to those having ordinary skill in the art. This is achieved because first control signal 112 and second control signal 114 both have voltage levels of +1 volt. Therefore, first feedback signal 104 and second feedback signal 106 are both multiplied by +1 volt using first multiplier circuit 120 and second multiplier circuit 122, respectively, causing first modified feedback signal 124 to have the same voltage level as first feedback signal 104, and causing second modified feedback signal 126 to have the same voltage level as second feedback signal 106. When move control signal 118 deactivates control signal generator 110, control signal generator 110 has no effect on the rest of optical disc tracking control device 84, thus allowing it to operate as a standard tracking servo loop capable of performing closed loop tracking of an information track and open loop JUMP and SEARCH operations.

When move control signal 118 activates control signal generator 110, control signal generator 110 generates predetermined voltage signals on first control signal 112 and second control signal 114, causing optical disc tracking control device 84 to radially move the light beam of the optical disc storage device across an optical disc in the direction specified by direction signal 116, while the tracking servo loop of optical disc tracking control device 84 remains in a closed mode of operation. When activated, control signal generator 110 changes the voltages of first control signal 112 and second control signal 114 from +1 volt to −1 volt and back to +1 volt again in a staggered fashion similar to any of the control signal plots depicted in FIGS. 6, 8 or 9, or described above. As mentioned above, it is preferred that first control signal 112 and second control signal 114 change their voltage levels from +1 volt to −1 volt and back to +1 volt again, using smooth transitions so the light beam radially moves across the disc in a smooth fashion.

Multiplier circuits 120 and 122 multiply activated first control signal 112 and activated second control signal 114 by first feedback signal 104 and second feedback signal 106, respectively, creating a continuous phase shift in the tracking error signal that causes a phantom track center to radially move across the optical disc. Because optical disc tracking control device 84 is operating in a closed loop mode, tracking servo 132 attempts to keep the light beam centered on the phantom track center, thereby causing the light beam to radially move across the disc. The phantom track center and the light beam both end up positioned on the center of the next information track when the voltage levels on first control signal 112 and second control signal 114 are both +1 volt. That is, the light beam moves one information track for each complete control cycle transmitted by control signal generator 110 on first control signal 112 and second control signal 114.

Therefore, sending N complete control cycles on first control signal 112 and second control signal 114 causes the light beam to move N information tracks. It can be appreciated, therefore, that PAUSE and SEARCH operations are accomplished by specifying the number of complete control cycles that are transmitted by first control signal 112 and second control signal 114.

Move control signal 118 can be configured so that control signal generator 110 repeatedly activates first control signal 112 and second control signal 114 while move control signal 118 is active, thereby causing the light beam to continue to radially cross several information tracks until move control signal 118 deactivates control signal generator 110; or, move control signal 118 can be configured so that control signal generator 110 only activates first control signal 112 and second control signal 114 once, causing the light beam to only move one information track until move control signal 118 is deactivated and activated again.

Figure 11:
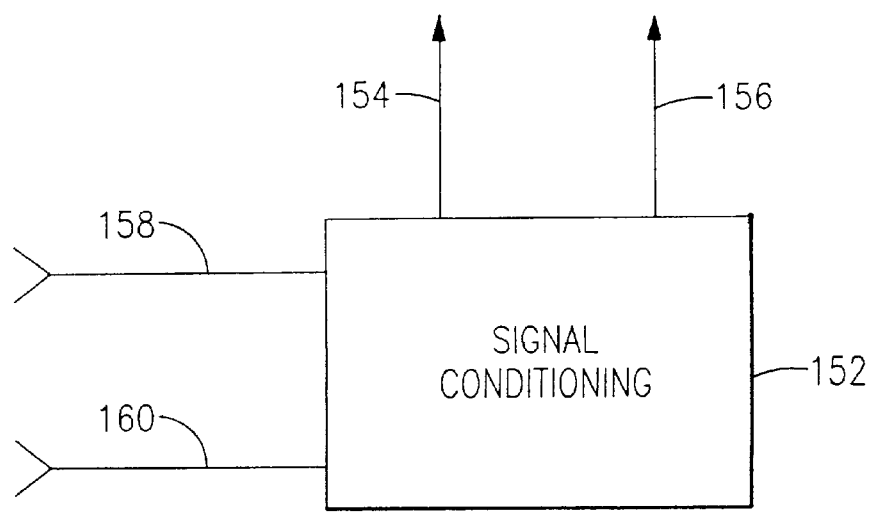
FIG. 11 illustrates an alternative control signal generator.

Referring to FIG. 11, there is shown a signal conditioning device 152. Signal conditioning device 152 has a first control signal 154 and a second control signal 156. Signal conditioning device also has a move forward signal 158 and a move reverse signal 160. Signal conditioning device 152 can be used to replace control signal generator 110 in optical disc tracking control device 84 by substituting first control signal 112 of control signal generator 110 with first control signal 154 of signal conditioning device 152, and by substituting second control signal 114 of control signal generator 110 with second control signal 156 of signal conditioning device 152.

When move forward signal 158 and move reverse signal 160 are both inactive, signal conditioning device 152 is inactive. When move forward signal 158 is active and move reverse signal 160 is inactive, the light beam radially moves forward across an optical disc. When move forward signal 158 is inactive and move reverse signal 160 is inactive, the light beam radially moves backward across an optical disc. When move forward signal 158 and move reverse signal 160 are both active, signal conditioning device 152 can be either inactive or issue an error.

Control signal generator 110 and signal conditioning device 152 can be any microprocessor, digital signal processor, look up table, or combination of circuitry well known to those skilled in the art suitable for generating staggered control signals that change voltage levels from +1 volt to −1 volt and back to +1 volt.

What is claimed is:

1. A method of radially moving a light beam across an optical disc while a tracking servo loop is in a closed loop mode of operation, comprising the steps of:

reflecting light from the optical disc and generating first and second feedback signals from the reflected light;

generating first and second control signals in a time staggered fashion;

multiplying said first and second control signals by said first and second feedback signals producing first and second modified feedback signals; and producing a tracking error signal by faking the differences between said first and second modified feedback signals, causing said tracking error signal to create a phantom track center that radially moves across said optical disc, thereby causing said light beam to also radially move across said optical disc.

2. The method according to claim 1, further comprising the steps of in a seek mode of tracking operation from a first Information track to a second information track varying said first control signal and said second control signal between a maximum value and a minimum value, wherein said first control signal and said second control signal never simultaneously have a magnitude of zero.

3. The method according to claim 2, wherein a first interval wherein said first control signal and said second control signal vary from said maximum value to said minimum value is equal to a second interval wherein said first control signal and said second control signal vary from said minimum value to said maximum value.

4. The method according to claim 2, wherein said varying of said first control signal and said second control signal is smoothly nonlinear.

5. A method of radially moving a light beam across an optical disc while a tracking servo loop is in a closed loop mode of operation, comprising the steps of:

reflecting light from the optical disc and generating first and second feedback signals from the reflected light;

generating first and second control signals that vary respectively from a first value to a second value;

multiplying said first and second control signals by said first and second feedback signals producing first and second modified feedback signals; and producing a tracking error signal by taking the differences between said first and second modified feedback signals, wherein responsive to said tracking error signal said light beam radially moves across said optical disc until said first control signal and said second control signal have reached their respective second values and have returned to their respective first values.

6. The method according to claim 5, wherein said first values of said first and second control signals are respectively inversions of said second values thereof.

* * * * *

UNITED STATES PATENT AND TRADEMARK OFFICE
CERTIFICATE OF CORRECTION

PATENT NO. : 5,978,329
DATED : Nov. 2, 1999
INVENTOR(S) : Ludwig Ceshkovsky

It is certified that error appears in the above-identified patent and that said Letters Patent is hereby corrected as shown below:

Col. 13, line 16, delete "faking" and insert --taking--.

Col. 13, line 24, delete "Information" and insert -- information --.

Signed and Sealed this

Fifth Day of September, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,978,329  
DATED : November 2, 1999  
INVENTOR(S) : Ludwig Ceshkovsky Page 1 of 1

It is certified that error appears in the above-identified patent and that said Letters Patent is hereby corrected as shown below:

Column 13:  
Line 16, please delete --faking-- and insert --taking--.  
Line 24, please delete --Information-- and insert --information--.

In the Figures:  
Figure 10 is deleted and substituted with the following:

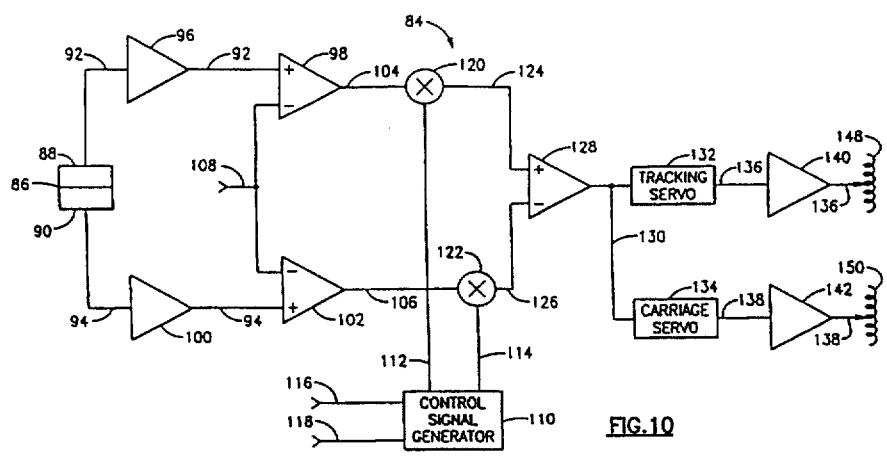

This Cerifiicate supercedes Certificate of Correction issued June 12, 2001.

Signed and Sealed this

Tenth Day of June, 2001

*Attest:*

NICHOLAS P. GODICI  
*Attesting Officer*  Acting Director of the United States Patent and Trademark Office

UNITED STATES PATENT AND TRADEMARK OFFICE
CERTIFICATE OF CORRECTION

PATENT NO. : 5,978,329
DATED : November 2, 1999
INVENTOR(S) : Ludwig Ceshkovsky

It is certified that error appears in the above-identified patent and that said Letters Patent is hereby corrected as shown below:

In the Figures:
Figure 10 is deleted and substituted with the following:

Signed and Sealed this

Twelfth Day of June, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO. : 5,978,329
DATED : November 2, 1999
INVENTOR(S) : Ludwig Ceshkovsky

Page 1 of 1

It is certified that error appears in the above-identified patent and that said Letters Patent is hereby corrected as shown below:

Column 13:
Line 16, please delete --faking-- and insert --taking--.
Line 24, please delete --Information-- and insert --information--.

In the Figures:
Figure 10 is deleted and substituted with the following:

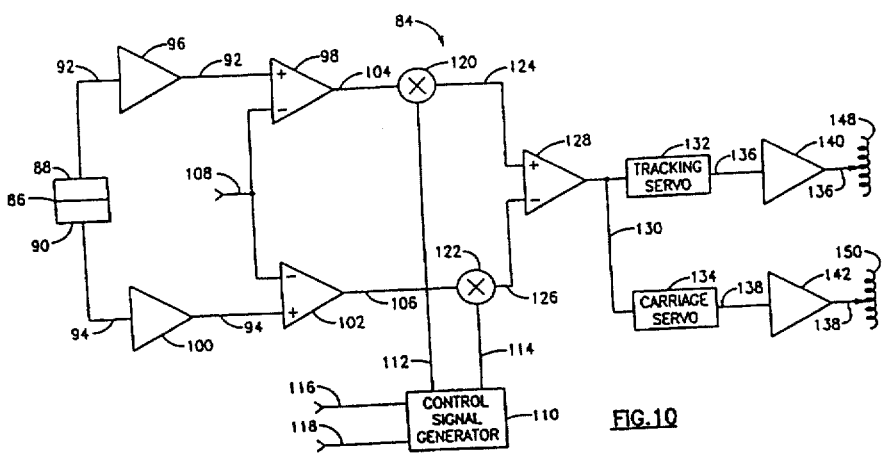

FIG.10

This Cerifiicate supercedes Certificate of Correction issued June 12, 2001.

Signed and Sealed this

Tenth Day of June, 2001

Attest:

NICHOLAS P. GODICI
Acting Director of the United States Patent and Trademark Office Attesting Officer